(12) United States Patent
Soni et al.

(10) Patent No.: US 10,139,789 B2
(45) Date of Patent: Nov. 27, 2018

(54) SYSTEM AND METHOD FOR ACCESS DECISION EVALUATION FOR BUILDING AUTOMATION AND CONTROL SYSTEMS

(71) Applicant: PHILIPS LIGHTING HOLDING B.V., Eindhoven (NL)

(72) Inventors: Amit Soni, Eindhoven (NL); Sandeep Shankaran Kumar, Waalre (NL); Sye Loong Keoh, Eindhoven (NL); Oscar Garcia Morchon, Aachen (NL); Fulong Ma, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 915 days.

(21) Appl. No.: 14/381,632

(22) PCT Filed: Feb. 20, 2013

(86) PCT No.: PCT/IB2013/051365
§ 371 (c)(1),
(2) Date: Aug. 28, 2014

(87) PCT Pub. No.: WO2013/128338
PCT Pub. Date: Sep. 6, 2013

(65) Prior Publication Data
US 2016/0139573 A1 May 19, 2016

Related U.S. Application Data

(60) Provisional application No. 61/680,307, filed on Aug. 7, 2012, provisional application No. 61/605,879, filed on Mar. 2, 2012.

(51) Int. Cl.
*G05B 15/02* (2006.01)
*H04L 12/28* (2006.01)
*H04L 29/06* (2006.01)

(52) U.S. Cl.
CPC ............ *G05B 15/02* (2013.01); *H04L 12/282* (2013.01); *H04L 63/10* (2013.01); *H04L 63/20* (2013.01); *G05B 2219/2642* (2013.01)

(58) Field of Classification Search
CPC . G05B 15/02; G05B 2219/2642; H04L 63/10; H04L 12/282; H04L 63/20
See application file for complete search history.

(56) References Cited

U.S. PATENT DOCUMENTS 7,716,489 B1  5/2010 Brandt et al.
2004/0174247 A1* 9/2004 Rodenbeck ........ G07C 9/00103
340/5.64

(Continued)

FOREIGN PATENT DOCUMENTS

EP          1582950 A2   10/2005
WO    2010060466 A1    6/2010

*Primary Examiner* — Jason Lin
(74) *Attorney, Agent, or Firm* — Meenakshy Chakravorty

(57) ABSTRACT

The present invention relates to a method for access decision evaluation in a building automation and control system, the method comprising: sending, from an accessing device (10) to an accessed device (20), an access request, sending, from the accessed device (20) to a central decision evaluation apparatus (30), an evaluation request asking if the access request is granted or denied, evaluating, at the central decision evaluation apparatus (30), the evaluation request using one or more central access control policies in order to reach a decision on if the access request is granted or denied, deriving, at the central decision evaluation apparatus (30), the one or more central access control policies that was used for evaluation into a device specific access policy, sending, from the central decision evaluation apparatus (30) to the accessed device (20), the decision and the device specific access policy, and storing, at the accessed device (20), the device specific access policy.

15 Claims, 4 Drawing Sheets

(56) References Cited

U.S. PATENT DOCUMENTS

| | | | |
|---|---|---|---|
| 2005/0005170 A1* | 1/2005 | Camenisch | G06F 21/33 |
| | | | 726/4 |
| 2005/0097349 A1* | 5/2005 | Watanave | G06F 21/604 |
| | | | 726/26 |
| 2005/0120204 A1 | 6/2005 | Kiwimagi et al. | |
| 2008/0163361 A1* | 7/2008 | Davis | G06F 21/31 |
| | | | 726/19 |
| 2008/0209505 A1 | 8/2008 | Ghai et al. | |
| 2010/0280636 A1 | 11/2010 | Holland et al. | |
| 2011/0254659 A1* | 10/2011 | Bowen | G07C 9/00158 |
| | | | 340/5.6 |
| 2011/0314261 A1* | 12/2011 | Brucker | G06F 21/6218 |
| | | | 712/207 |
| 2011/0321121 A1* | 12/2011 | Honda | G06F 21/6218 |
| | | | 726/1 |
| 2012/0022700 A1 | 1/2012 | Drees et al. | |

* cited by examiner

SYSTEM AND METHOD FOR ACCESS DECISION EVALUATION FOR BUILDING AUTOMATION AND CONTROL SYSTEMS

CROSS-REFERENCE TO PRIOR APPLICATIONS

This application is the U.S. National Phase application under 35 U.S.C. § 371 of International Application No. PCT/IB13/051365, filed on Feb. 20, 2013, which claims the benefit of U.S. Provisional Patent Application No. 61/680,307, filed on Aug. 7, 2012 and U.S. Provisional Patent Application No. 61/605,879, filed on Mar. 2, 2012. These applications are hereby incorporated by reference herein.

FIELD OF THE INVENTION

The present invention relates to a method for access decision evaluation in a building automation and control system. The invention also relates to an access decision evaluation system in a building control system, a central decision evaluation apparatus in the access decision evaluation system and an accessed device in an access decision evaluation system.

BACKGROUND OF THE INVENTION

A Building Automation and Control System (BACS) is being deployed in commercial buildings to enable monitoring and control of the various intelligent systems in the building like HVAC (Heating, Ventilation and Air-Conditioning), safety, access and lighting systems. The BACS provides the integrated control of the various systems based on the energy, safety and user needs in the buildings. The control is realized using various controllers connected to an intelligent network of sensors (which provide real-time status) and actuators (which provide real-time control). Users can read the status from displays and change the settings according to their preferences using switches. The BACS is configured and managed from a Supervisor attached to the building network, which enables precise definitions of the behavior of the system under various circumstances. Additionally, the BACS can be controlled during operation from a back-end management server or through remote interfaces like a web browser.

Traditionally, the various systems in a BACS have been independent with different personnel in charge of the system operation and maintenance. However, with the advent of wireless mesh open standards (like ZigBee, Bluetooth, NFS, etc.) and IP based communication in building control networks, the barriers between the various systems are largely removed and this creates a more closely integrated system. Therefore, integration in the functional level leading to new functionalities has become much simpler. However, this requires that security and access of the various systems can be assured to its operational and maintenance owners.

Current trends in the field of BACS reveal that inadequate work has been done to design BACS while taking into account adequate information security needs. Presently, BACS security works by isolating the systems physically from each other to prevent unauthorized access. However, in an integrated and open-standards based BACS, this poses new requirements for access control (including authentication and authorization) on all the services provided and consumed by the different intelligent building systems.

The proper flow of information in the BACS becomes a matter of concern when a security attack could cause unwanted consequences. These unwanted consequences range from simple privacy breach (e.g. spying on trends of a particular office room) to life threatening situation (e.g. compromised ventilation system).

Access control mechanisms are well studied and applied in computer networks. However such access control mechanisms cannot be directly applied to BACS due to various constraints, for example: user perceived delay in operation (e.g. from a switch when operating a light); memory and computationally constrained devices; a potentially large number of devices in the system; shared low-throughput communication links; possible emergency situations (like fire).

This requires that the access control system for BACS has the following requirements: low-latency operation (to minimize user perceived delay in operation); resource efficient implementation (due to memory and computationally constrained devices); scalable design (due to large number of devices); communication efficient (due to shared low-throughput communication links); and fault-tolerant (due to possible emergency situations).

The current state of research in the field of authorization for distributed systems, a BACS is an example of a distributed system, can be divided into a centralized and a distributed approach for access control systems. The centralized approach and the distributed approach will be briefly discussed below, for a more detailed discussion of the centralized and the distributed approaches please see further below under the detailed description.

In the centralized approach a central decision point is a separate entity in the network. For each access control request between two devices the decision has to be made by this central decision point based on context information. Here context implies location, time, situation (emergency, normal, etc.), number of people in the room, environmental situation (temperature, ventilation level, etc.) and other information relevant to make a particular access control decision. The centralized approach provides scalability in the number of devices that can be added to the network; however it severely hinders efficiency due to the communication overhead on low throughput links especially for simple access requests.

In the distributed approach, the evaluation and the storage of the policies takes place in the different devices locally without the involvement of a centralized decision point, and which would not be present in a system using the distributed approach. The distributed approach reduces the communication overhead and latency. However, the problem with this type of authorization is that it is not scalable due to the need to duplicate the various access control policies that are needed under different contexts. Currently, devices like sensors and actuators used in BACS do not have enough memory resources to store rules for all the relevant devices and users in the network.

SUMMARY OF THE INVENTION

It is an object of the present invention to overcome the above problems with the centralized approach and the distributed approach, respectively.

In this document the following terminology for access control systems are used:

Authentication: Verifying the identity of a user, process, or device, often as a prerequisite to allowing access to resources in an information system.

Authorization: Access privileges granted to a user, program, or process or the act of granting those privileges.

Access: Ability and means to communicate with or otherwise interact with a system, to use system resources to handle information, to gain knowledge of the information the system contains, or to control system components and functions.

Access control: The process of granting or denying specific access requests for obtaining and using information and related information processing services.

Access control system: Security safeguards (i.e., hardware and software features, physical controls, operating procedures, management procedures, and various combinations of these) designed to detect and deny unauthorized access and permit authorized access to an information system.

Access control policy (also referred to as policy in this document): A set of criteria for the provision of access to resources.

Context source is a source being arranged to give context information, e.g. location, time, situation (emergency, normal, etc.), number of people in the room, environmental situation (temperature, ventilation level, etc.) and other information relevant to make a particular access control decision. Some non-limiting examples of context sources are: a calendar service, a people counter, thermometer, light intensity measuring device, oxygen level measuring device, air flow meter, pressure sensor and humidity sensor.

Accessing device is a device arranged to access a device in a building automation and control system in order to control a function of the device in a building automation and control system. The accessing device may e.g. be a handheld computing device (e.g. a smart phone, a PDA or a tablet computer), a device comprising an RFID-chip, a switch, a motion sensor, a light device (controlling other light devices to create a scene) etc.

Accessed device is a device being accessed or being accessible by the accessing device. The accessed device is a device in a building automation and control system performing a function of the building automation and control system. Some non-limiting examples of an accessed device are: a lightning device, an air conditioner, window blinds, an electronic lock and an air dampener.

According to a first aspect of the invention, the above mentioned object is achieved by a method for access decision evaluation in a building automation and control system. The method comprising: sending, from an accessing device to an accessed device, an access request, sending, from the accessed device to a central decision evaluation apparatus, an evaluation request asking if the access request is granted or denied, evaluating, at the central decision evaluation apparatus, the evaluation request using one or more central access control policies in order to reach a decision on if the access request is granted or denied, deriving, at the central decision evaluation apparatus, from the one or more central access control policies that was used for evaluation a device specific access policy, sending, from the central decision evaluation apparatus to the accessed device, the decision and the device specific access policy, and storing, at the accessed device, the device specific access policy.

According to this method a scalable, i.e. in terms of the number of devices that can be added to the network, access control system for a BACS is provided. Moreover by allowing for the deployment of access control policies to the accessed devices under request, communication overhead and latency when the accessing device wants to access its resources in subsequent access requests to the accessed device is minimized.

The method may further comprise sending, from the accessing device to the accessed device, a subsequent access request, and evaluating, at the accessed device, if the subsequent access request matches with the device specific access policy stored in the accessed device, if so, deciding, at the accessed device, if the subsequent access request is granted or denied based on the device specific access policy.

The step of deriving the device specific access policy may further comprise deriving the device specific access policy with context attributes as variable to enable the accessed device to evaluate subsequent access requests from the accessing device under different contexts. This minimizes the communication with the central decision evaluation apparatus for decisions on new access requests when the context has changed.

The step of deciding if the subsequent access request is granted or denied may further comprise requesting context information from a context source.

The method may further comprise encoding at the central decision evaluation apparatus, the device specific access policy. By encoding the device specific access policy its size may be reduced and thus the amount of data to be transmitted in the building automation and control system is reduced and also reduces the amount of policy data that needs to be stored on the accessed device.

The device specific access policy may be stored in a local memory of the accessed device, wherein the local memory is a size-constrained local memory only being able to store a fixed amount of device specific access policies.

The device specific access policy stored in the local memory may be prioritized, wherein the device specific access policy is prioritized locally, by the accessed device or centrally by the central decision evaluation apparatus. By prioritizing the device specific access policy it may be assured that the most important device specific access policies are still stored on the accessed device although the memory of the accessed device is limited. Further it may be assured that the most important device specific access policies will be quickly found on the accessed device if they have a high priority.

The device specific access policy stored at the accessed device may be updated by synchronization with the one or more central access control policies at the central decision evaluation apparatus, wherein the update of the device specific access policy is controlled with an additional attribute added to the device specific access policy during derivation at the central decision evaluation apparatus. Thus, it may be assured that the device specific access policies represent the current access control policy at the central decision evaluation point, this since the central access control policy can change over time at the central decision evaluation apparatus. Thus, by synchronizing the device specific access policy with the central access control policy the device specific access policy will be updated to reflect the current central access policy.

The method may further comprise creating an authenticated channel between the accessing device and the accessed device and between the accessed device and the central decision evaluation apparatus. By authenticating the communication between the devices in the building automation and control system it is ensured that unauthorized access is avoided. Hence, only devices that are meant to be members of the building automation and control system have access to each other.

According to a second aspect of the invention, the above mentioned object is achieved by an access decision evaluation system in a building control system. The access decision evaluation system comprising: an accessing device, an accessed device comprising a local memory storing one or more device specific access policies, a matching point and a policy decision point, and a central decision evaluation apparatus comprising a database of one or more central access control policies, an access policy decision point and an access policy deriver, wherein the accessing device is arranged to send an access request to the accessed device, wherein the matching point of the accessed device is arranged to evaluate the access request to see if the access request matches with a device specific access policy stored in the local memory, if so, the policy decision point of the accessed device is arranged to decide if the access request is granted or denied based on the matched device specific access policy, if not so, the accessed device is arranged to send an evaluation request asking if the access request is granted or denied to the central decision evaluation apparatus, wherein the access policy decision point of the central decision evaluation apparatus is arranged to evaluate the evaluation request using one or more central access control policies in order to reach a decision on if the access request is granted or denied, wherein the access policy deriver of the central decision evaluation apparatus is arranged to derive from the one or more central access control policies that was used for the evaluation a derived device specific access policy, and wherein the central decision evaluation apparatus is arranged to send the decision and the derived device specific access policy to the accessed device.

The access policy deriver may further be arranged to derive the device specific access policy with context attributes as variable to enable the accessed device to evaluate subsequent access requests from the accessing device under different contexts, and wherein the policy decision point of the accessed device is arranged to decide if subsequent access requests are granted or denied by requesting context information from a context source comprised in the access decision evaluation system.

According to a third aspect of the invention, the above mentioned object is achieved by a central decision evaluation apparatus in an access decision evaluation system comprising an accessing device, an accessed device and the central decision evaluation apparatus. The central decision evaluation apparatus comprising: a database of one or more central access control policies, an access policy decision point arranged to evaluate an evaluation request from the accessed device using one or more central access control policies stored in the database in order to reach a decision on if an access request being sent from the accessing device to the accessed device is granted or denied, and an access policy deriver arranged to derive from the one or more central access control policies that was used for the evaluation a device specific access policy, wherein the central decision evaluation apparatus is arranged to send the decision and the device specific access policy to the accessed device.

The access policy deriver may further be arranged to derive the device specific access policy with context attributes as variable to enable the accessed device to evaluate subsequent access requests from the accessing device under different contexts.

According to a fourth aspect of the invention, the above mentioned object is achieved by an accessed device in an access decision evaluation system comprising an accessing device, the accessed device and a central decision evaluation apparatus. The accessed device comprising: a local memory storing one or more device specific access policies, a matching point, and a policy decision point, wherein the matching point is arranged to evaluate an access request from the accessing device to see if the access request matches with a device specific access policy stored in the local memory, if so, the policy decision point is arranged to decide if the access request is granted or denied based on the matched device specific access policy, if not so, the accessed device is arranged to send an evaluation request asking if the access request is granted or denied to the central decision evaluation apparatus.

The local memory may be a size-constrained local memory only being able to store a fixed amount of device specific access policies.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
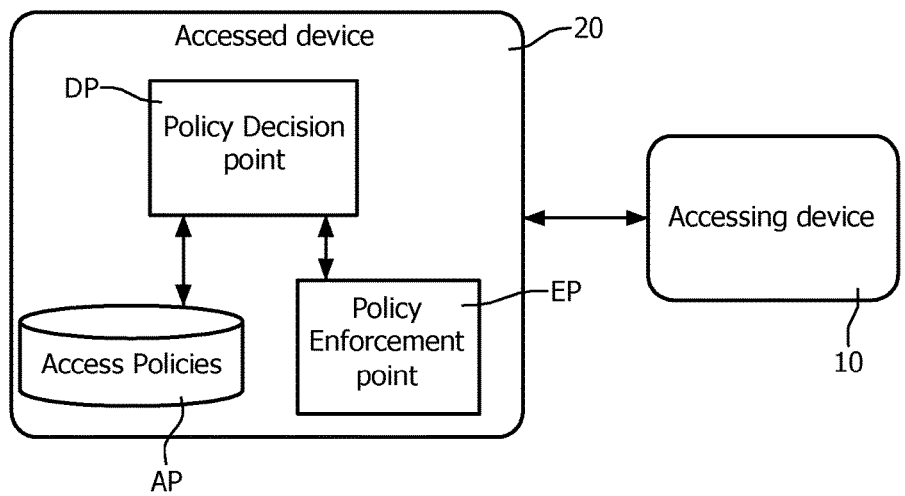
FIG. 1 shows components of an access control system using a distributed approach.
Figure 2:
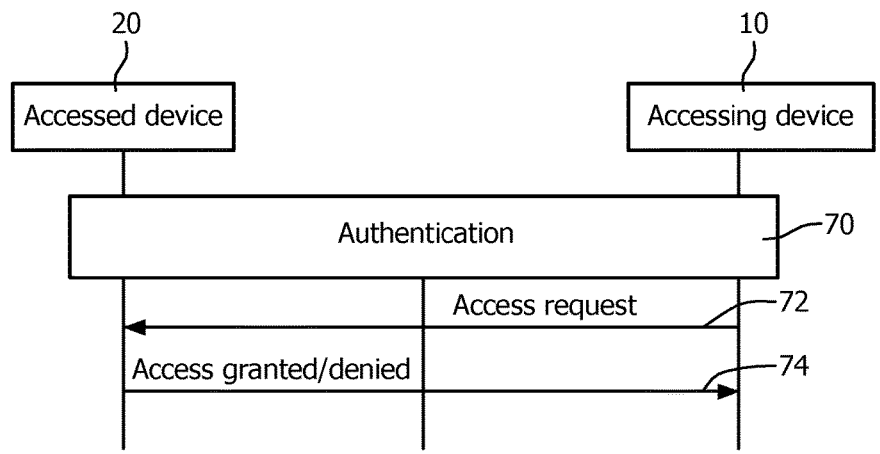
FIG. 2 shows communication pathways in the access control system of FIG. 1.

The distributed approach mentioned above will be discussed in connection with FIGS. 1 and 2. It is assumed that an accessing device 10 can discover an accessed device 20 and hence knows the address and services of the accessed device 20. Authentication is the first step, step 70, in the access control procedure. Since, the accessing device 10 and the accessed device 20 have limited resources we would assume that symmetric key encryption and/or efficient hash functions are used for obfuscation. Mutual authentication is performed using one of several methods known by the person skilled in the art. Once mutual authentication is established, the accessing device 10 tries to access some service provided by the accessed device 20 by sending an access request to the accessed device 20, step 72. Thereafter, the accessed device 20 evaluates the access request using access control policies AP stored in the accessed device 20 and deciding if the accessing device 10 is allowed to perform the action it requests or not. Thus, a policy decision point DP is in the accessed device 20 itself. Enforcement follows the decision. The result of the decision is sent back to the accessing device 10, step 74. Since the policy decision point DP is in the same device where we want to perform the enforcement using a policy enforcement point EP, enforcement is rather trivial. The process running the device as the policy decision point DP would inform the access decision to the process running as the service provider using the policy enforcement point EP.

For monitoring and management of devices, the same scheme is repeated. Devices would contain appropriate access control rules for a domain monitor, automator, maintainer, etc. When the domain monitor, automator, or maintainer wants to execute some actions on the devices, the above discussed scheme for decision and enforcement is applied.

Figure 3:
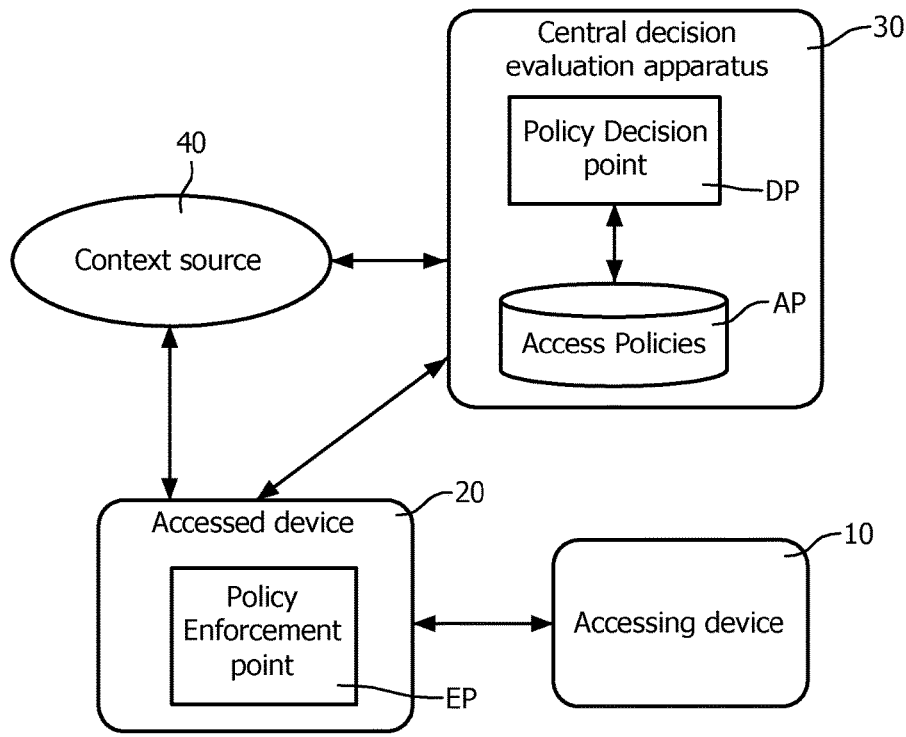
FIG. 3 shows components of an access control system using a centralized approach.
Figure 4:
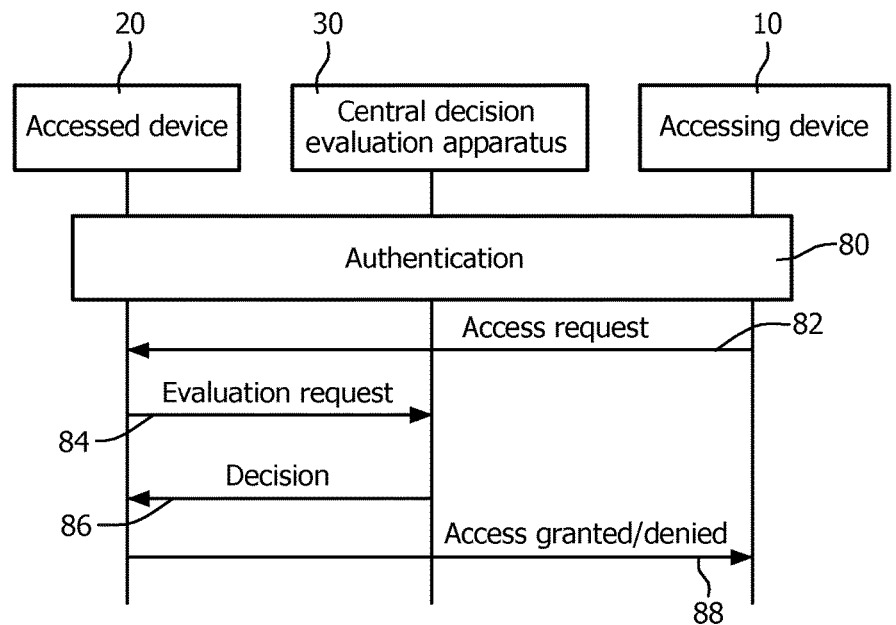
FIG. 4 shows communication pathways in the access control system of FIG. 3.

In the centralized approach, as shown in FIGS. 3 and 4, a central decision evaluation apparatus 30 is a separate entity in the network. For each access request between the accessing device 10 and the accessed device 20 the decision has to be made by the central decision evaluation apparatus 30 based on context information provided by a context source 40. Here context implies location, time, situation (emergency, normal, etc.), number of people in the room, environmental situation (temperature, ventilation level, etc.) and other information relevant to make a particular access control decision. According to this, when the accessing device 10 wants to communicate to the accessed device 20, the authentication phase would be the same as that in the distributed approach since the keys are still in the accessing device 10 and the accessed device 20. After mutual authentication between the accessing device 10 and the accessed device 20, there needs to be mutual authentication between the accessed device 20 and the central decision evaluation apparatus 30. The mutual authentication between the t accessing device 10 and the accessed device 20 and between the accessed device 20 and the central decision evaluation apparatus 30 is illustrated as step 80 in FIG. 4. Once mutual authentication is established, the accessing device 10 tries to access some service provided by the accessed device 20 by sending an access request to the accessed device 20, step 82, The accessed device 20 then sends an evaluation request to the central decision device 30, step 84. The central decision evaluation apparatus 30 evaluates the evaluation request using access control policies AP stored in the central decision evaluation apparatus 30 in order to reach a decision on if the access request from the accessing device 10 is granted or denied. Thus, according to the centralized approach the policy decision point DP is centrally located in the central decision evaluation apparatus 30. The decision is sent to the accessed device 20, step 86, and enforcement takes place in the same way as in the distributed approach and the result of the decision is sent back to the accessing device 10, step 88.

A simple modification of the above discussed scheme is also possible. Such a modification is to enable access requests by the accessing device 10 to the central decision evaluation apparatus 30. By doing so the step of mutual authentication between the accessing device and the accessed device 20 is not needed. The logic behind this is simple, if the accessing device 10 already knows that it is not able to execute certain actions on the accessed device 20, it would not be authenticating itself to the accessed device 20 in the first place.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

The invention proposes a new access control approach denoted as Hybrid Access Decision Evaluation (HADE) and that takes the advantages of both the centralized and the distributed approaches but overcomes their disadvantages. The HADE technique relies on a centralized decision point to derive and encode access control policies relevant to a particular device (from the access control policies defined centrally) which can be cached locally on the device and henceforth referred to as device specific access policies. These device specific access policies are so generated to enable their evaluation under different contexts like location, time, situation (emergency, normal, etc.), number of people in the room, environmental situation (temperature, ventilation level, etc.). This minimizes the communication with the central decision point for decisions on new access requests under the different contexts.

Figure 5:
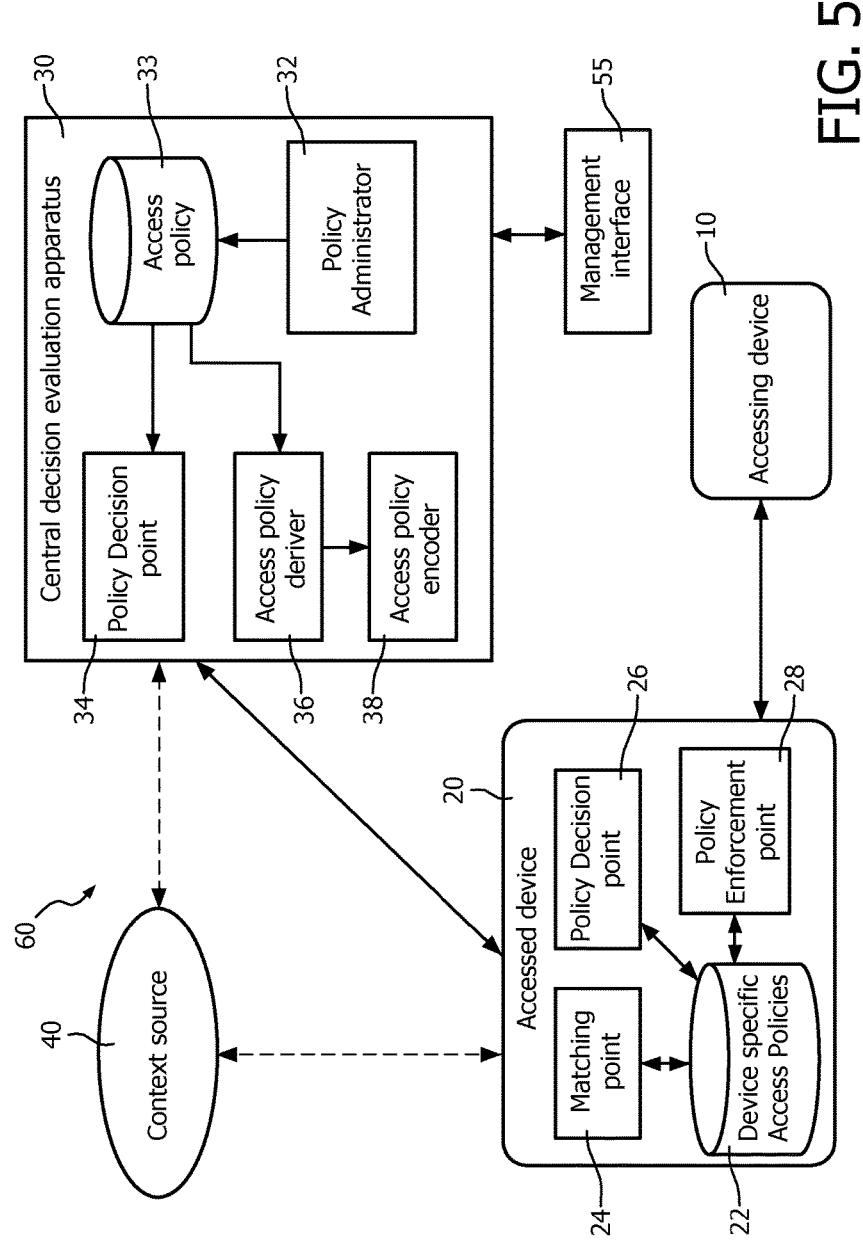
FIG. 5 shows components of an access control system according to the present invention.
Figure 6:
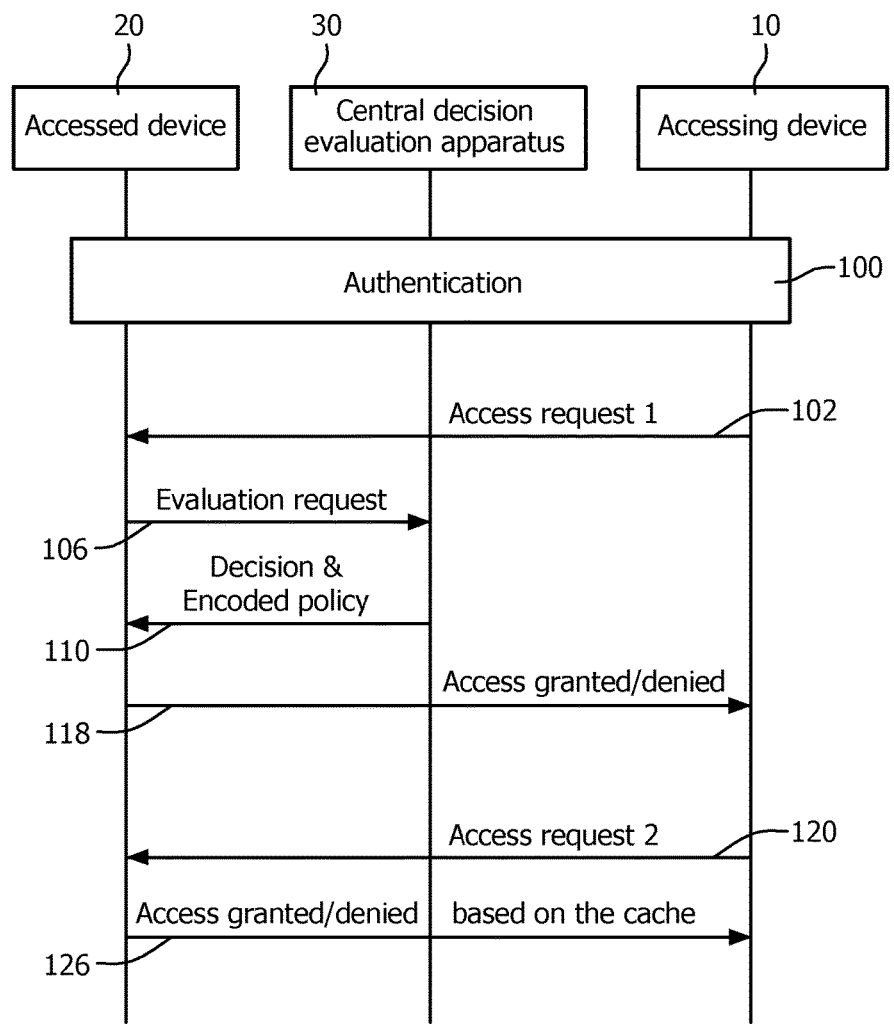
FIG. 6 shows communication pathways in the access control system of FIG. 5.

With reference to FIGS. 5 and 6 the approach of the Hybrid Access Decision Evaluation (HADE) will be discussed. The Building control system consists of various devices (e.g. sensors, actuators and user interfaces) which are commissioned into the system by a trusted authority. Therefore, after commissioning, the devices are bound to a single Trust Point to enable a secure authentication. The Trust Point could be a physical server that can create authentication tokens or pre-configured secret keys that are used to authenticate as a trusted node within the domain.

The main elements of an access decision evaluation system 60 in a building automation and control system, using HADE, according to the present invention are shown in FIG. 5.

The access decision evaluation system 60 comprises an accessing device 10, an accessed device 20 and a central decision evaluation apparatus 30.

Although the access decision evaluation system 60 as disclosed in FIG. 5 comprises only one accessing device 10 and one accessed device 20 it is to be understood that depending on the design of the access decision evaluation system 60 a plurality of accessing devices 10 and accessed devices 20 may be present. Moreover, the access decision evaluation system 60 may also comprise one or more centralized decision evaluation devices 30.

The central decision evaluation apparatus 30 comprises a policy administrator 32, an access control policies database 33, an access policy decision point 34, an access policy deriver 36 and an access policy encoder 38.

The policy administrator 32 is arranged to administrate central access control policies stored in the access control policies database 33 based on input from a management interface 55. This is done by any personnel with roles but not limited to operational or maintenance administrator of the building, through a terminal physically attached to the central evaluation apparatus 30 or remotely from any terminal that has network connectivity to the central evaluation apparatus 30, after proper authentication of the personnel. The personnel will be presented with a policy administrating interface where existing policies can be edited or deleted and new policies can be added based on the authorization rules applicable to the personnel. Based on the changes in the policy administrating interface and the authorization rules of the personnel, the policy administrator 32 performs the appropriate changes in the access policies database 33.

The access control policies database 33 comprises central access control policies. Each central access control policy is a set of criteria for the provision of access to resources of accessed devices in the BACS.

The access policy decision point 34 is arranged to evaluate an evaluation request originating from the accessed device 20 using one or more of the central access control policies of the access control policies database 33 in order to reach a decision on if an access request from the accessing device 10 is granted or denied. Moreover, the central decision evaluation apparatus 30 is arranged to communicate with a context source 40 located in the access decision evaluation system 60. When evaluating the evaluation request the access policy decision point 34 is further arranged to request context information from the context source 40 so that the decision reached is based on the context situation.

The access policy deriver 36 is arranged to derive the policy that was used for evaluation of the evaluation request into a device specific access policy. Moreover, the access policy deriver 36 is further arranged to derive the device specific access policy with context attributes as variable to enable the accessed device 20 to evaluate subsequent access requests from the accessing device 10 under different contexts.

The access policy encoder 38 is arranged to encode the device specific access policy before it is being sent to the accessed device 20. By doing so, communication overhead is reduced.

Accordingly, the access policy deriver 36 together with the access policy encoder 38 are arranged to derive and encode device specific access policies from centrally defined access policies stored in the access control policies database 33. The device specific access policies only comprise the relevant rules valid for the accessed device 20. Thus, the device specific access policies may be small in size. Further the device specific access policies are encoded so that they can be compressed for transmission and storage on the accessed device 20. For example, this compression could be encoding Extensible Markup Language (XML) based policies to smaller JavaScript Object Notation (JSON) based or binary Type-Length-Value (TLV) based policies.

Thus, the central decision evaluation apparatus 30 is arranged to derive and encode access policies that are specific to the accessed device 20 to enable distributed access decision to minimize communication overhead and latency when the accessing device 10 wants to access its resources in subsequent requests.

Thus, the centralized decision evaluation device 30 is arranged to: derive and encode access policies that are specific to the accessed device 20; to distribute the derived and encoded access policies that are specific to the accessed device 20 to the accessed device 20. By doing so, distributed access decision is enabled. This minimizes the communication overhead and latency when the accessing device 10 wants to access its resources in subsequent access requests to the accessed device 20.

Moreover, the device specific access policy derived in the central decision evaluation apparatus 30 retains the context variables that need to be evaluated to keep it flexible. This reduces the communication overhead for subsequent access requests between the accessed device 20 and the central decision evaluation apparatus 30 when the context has changed.

The accessed device 20 comprises a database 22 of device specific access policies, a matching point 24, a policy decision point 26 and a policy enforcement point 28.

The database 22 of device specific access policies comprises device specific access policies derived at the central decision evaluation apparatus 30. The database 22 of device specific access policies is a local memory. Normally, the local memory is a size-constrained local memory only being able to store a fixed amount of device specific access policies. As a non limiting example SRAM memory sizes for such devices may 512 bytes of which only a portion like 100 bytes can be used as local memory for the device specific access policies. It is however realized that other memory sizes may be used.

The device specific access policies are stored in the local memory 22 of the accessed device 20. The methodology for caching of the device specific access policies on a size-constrained device can be based on multiple caching techniques which ensure that frequently used policies and important (emergency related) policies are retained with higher priority. Without limitation, some examples of such techniques are:

Replacing policies that are least frequently used,

Replacing policies not used for the longest time since cached,

Replacing policies pertaining to mobile accessing devices before replacing policies pertaining to physically fixed accessing devices.

The decision to retain a device specific access policy in the local memory 22 can be enforced using a locally, on the accessed device 20, defined priority which prevents certain important device specific access policies (like emergency related) from being replaced. This could be relevant for emergency critical accessed devices like corridor lights, ventilation systems, etc. It is important that they can respond immediately to an emergency access request. Therefore, such devices can be provided with priority rules to be enforced locally that can over-rule any centralized cache prioritization rules that are in conflict.

The central decision evaluation apparatus 30 can add an additional attribute during the derivation of the device specific access policy, like a "cache priority" attribute, that helps the accessed device 20 to prioritize device specific access policies that are to be retained in its local memory 22.

The decision to cache a device specific access policy can also be done based on local policies defined on the device by the manufacturer or operator of the device. Such policies are determined based on pre-existing knowledge of the operational environment in which operational managers know which kind of requests needs minimum latency even though they are infrequent. Other aspects could be the type of policy for e.g., emergency decisions (like fire) could be always cached to prevent network bottlenecks during a critical time and be fault-tolerant.

Thus, the decision to cache the device specific access policy in the device's local memory can be taken based on multiple aspects or a combination of them.

The device specific access policies only represent the current access control policy at the central decision evaluation apparatus 30 but this access control policy can change over time at the central decision evaluation apparatus 30. Therefore, the device specific access policies need to be updated regularly to be synchronized with the central access control policy at the central decision evaluation apparatus 30. The accessed device 20 can be update based on additional attributes that are added by the central decision evaluation apparatus 30 during the derivation for e.g. a "time-to-live" attribute. Additional attributes like "update communication" can be added which specifies how the accessed device 20 gets the update done; either with publish-subscribe model, or explicit request for updated policy.

The matching point 24 is arranged to match a new access request from the accessing device 10 with any of the device specific access policies in the local memory 22 of the accessed device 20. If no match is found, then the accessed device 20 is arranged to send an evaluation request to the central decision evaluation apparatus 30. If a match is found the policy decision point 26 of the accessed device 20 is arranged to take a decision granting or denying the access request from the accessing device 10.

The policy enforcement point 28 is arranged to enforce the decision granting or denying an access request from the accessing device 10. The decision on granting or denying the request may be taken either at the centralized decision evaluation device 30 or at the accessed device 20 itself.

Moreover, the device specific access policy is evaluated on the accessed device 20 based on the current context information. Thus, the accessed device 20 is arranged to communicate with a context source 40 to receive context information over an authenticated channel. The context communication can also be performed under different models like: publish and subscribe context information, or explicit context information request. Further, the type of context information (e.g. emergency fire) or the context source 40 provides the accessed device 20 with additional information to prioritize the retention of certain device specific access policies in its local memory 22.

In FIG. 6 the communication steps when the accessing device 10 sends access requests for a particular resource on the accessed device 20 are shown. The first step 100 is to create an authenticated channel between the accessing device 10 and the accessed device 20 which is done either with pre-shared secrets; other key-distribution mechanisms like Kerberos key distribution (see e.g. Neuman, B., and Ts'o, T. Kerberos: An authentication service for computer networks. Communications Magazine, IEEE 32, 9 (1994), 33-38) or any other suitable method for creating an authenticated channel between devices. Thus, an authenticated channel between the accessing device 10 and the accessed device 20 and between the accessed device 20 and the central decision evaluation apparatus 30 is created. Thereafter the following steps are performed:

The accessing device 10 sends an authenticated access request to the enforcement point on the accessed device 20, step 102.

The accessed device 20 checks if the new access request matches with any of the device specific access policies in its local memory. If no match is found, then the accessed device 20 sends an evaluation request to the central decision evaluation apparatus 30, step 106.

The central decision evaluation apparatus 30 not only evaluates the evaluation request but also derives and encodes the one or more central access control policies that were used for evaluation into a device specific access policy. These are sent back to the accessed device 20, step 110.

Upon receiving the device specific access policy, the accessed device 20 stores it in its database 22 of device specific access policies. If the database 22 is already full, then the accessed device 20 uses any one of multiple techniques (discussed above) to decide if an existing device specific access policy can be replaced with the new policy.

The decision to grant access to its resource is enforced by the policy enforcement point 24 of the accessed device 20 and the feedback is sent back to the accessing device 10, step 118.

In a subsequent access request, step 120, from the accessing device 10, which can be decided based on the cached device specific access policy, the decision is performed by the accessed device 20 itself, based on the device specific access policy stored locally at the accessed device 20, allowing for distributed control. During this evaluation, the accessed device 20 may require context information from authenticated context sources 40. The feedback is sent back to the accessing device 10, step 126.

Below an exemplifying application scenario for the present invention will shortly be discussed. One exemplifying application scenario is the integration of lighting with window blinds and HVAC in an office building. It is well-known that day-light harvesting can improve energy efficiency for lighting. This requires that when sufficient day-light is present, the window blinds can open and also dim down the lights. However this should be done only when the room is occupied, since open blinds could lead to wasted energy in air-conditioning. This requires close interaction of both systems at a local (room) level allowing for mutual control. The control can additionally be influenced by the users who wish to override the change or have specific preferences on the lighting level. The users could then control from the user interfaces installed within the room, or more flexibly with their smart-phones. This shows the need for proper authentication and authorization requirements between the systems without creating communication bottlenecks and latency in operation. Therefore the central decision point is used to create the policies that commission the system to allow room level control of devices and smart-phone devices of users. Each of the devices being controlled in the room, lights, blinds, etc. have an enforcement engine and local memory for caching device specific access policies. This allows for low latency direct control requests between devices once they know the device specific access policies enabled by the backend management system. Additional context can be made available for e.g., a time and calendar service, allowing for different behavior of the devices during office hours and weekends.

The person skilled in the art realizes that the present invention by no means is limited to the preferred embodiments described above. On the contrary, many modifications and variations are possible within the scope of the appended claims.

For example, the policy administrator 32, the access control policies database 33, the access policy decision point 34, the access policy deriver 36 and the access policy encoder 38 of the central decision evaluation apparatus 30 may be members of a single device as illustrated in FIG. 5. However, one or more of the policy administrator 32, the access control policies database 33, the access policy decision point 34, the access policy deriver 36 and the access policy encoder 38 of the central decision evaluation apparatus 30 may be arranged as specific devices making up the central decision evaluation apparatus 30.

Moreover, the access decision evaluation system in a building control system may comprise one or more context sources, the different context sources giving feedback on different context.

Furthermore, the function of the accessed device 20 and/or the central decision device 30 may be implemented by hardware, software or a combination thereof.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. Method for access decision evaluation in a building automation and control system, the method comprising:
   sending, from an accessing device to an accessed device, an access request,
   sending, from the accessed device to a central decision evaluation apparatus, an evaluation request asking if the access request is granted or denied,
   evaluating, at the central decision evaluation apparatus, the evaluation request using one or more central access control policies in order to reach a decision on if the access request is granted or denied, deriving, at the central decision evaluation apparatus, from one or more central access control policies that was used for evaluation a device specific access policy, sending, from the central decision evaluation apparatus to the accessed device, the decision and the device specific access policy, wherein the device specific access policy is sent with the decision from the central decision evaluation apparatus to the accessed device without regard as to whether the access request is granted or denied, storing, at the accessed device, the device specific access policy; and deciding, at the accessed device, if a subsequent access request is granted or denied based on the device specific access policy.

2. Method according to claim 1, further comprising:
sending, from the accessing device to the accessed device, the subsequent access request,
evaluating, at the accessed device, if the subsequent access request matches with the device specific access policy stored in the accessed device, wherein the deciding, at the accessed device, is performed in response to the subsequent access request matching the device specific access policy.

3. Method according to claim 1, wherein the step of deriving the device specific access policy further comprises deriving the device specific access policy with context attributes as variables to enable the accessed device to evaluate subsequent access requests from the accessing device under different contexts.

4. Method according to claim 2, wherein the step of deciding if the subsequent access request is granted or denied further comprises requesting context information from a context source.

5. Method according claim 4, further comprising encoding, at the central decision evaluation apparatus, the device specific access policy.

6. Method according to claim 5, wherein the device specific access policy is stored in a local memory of the accessed device, wherein the local memory is a size-constrained local memory only being able to store a fixed amount of device specific access policies.

7. Method according to claim 6, wherein the device specific access policy stored in the local memory is prioritized, with the device specific access policy prioritized locally, by the accessed device or centrally by the central decision evaluation apparatus.

8. Method according to claim 7, wherein the device specific access policy stored at the accessed device is updated by synchronization with one or more central access control policies at the central decision evaluation apparatus, wherein the update of the device specific access policy is controlled with an additional attribute added to the device specific access policy during derivation at the central decision evaluation apparatus.

9. Method according to claim 8, further comprising creating an authenticated channel between the accessing device and the accessed device and between the accessed device and the central decision evaluation apparatus.

10. Access decision evaluation system in a building control system, the access decision evaluation system comprising:
an accessing device,
an accessed device comprising a local memory storing one or more device specific access policies, a matching point and a policy decision point, and
a central decision evaluation apparatus comprising a database of one or more central access control policies, an access policy decision point and an access policy deriver,
wherein the accessing device is arranged to send an access request to the accessed device,
wherein the matching point of the accessed device is arranged to evaluate the access request to see if the access request matches with one of the one or more device specific access policies stored in the local memory, if so, the policy decision point of the accessed device is arranged to decide if the access request is granted or denied based on the matched device specific access policy, if not so, the accessed device is arranged to send an evaluation request asking if the access request is granted or denied to the central decision evaluation apparatus,
wherein the access policy decision point of the central decision evaluation apparatus is arranged to evaluate the evaluation request using at least one of the one or more central access control policies in order to reach a decision on if the access request is granted or denied, wherein the access policy deriver of the central decision evaluation apparatus is arranged to derive from the at least one of the one or more central access control policies that was used for the evaluation a derived device specific access policy, and
wherein the central decision evaluation apparatus is arranged to send the decision and the derived device specific access policy to the accessed device, wherein the central decision evaluation apparatus sends the derived device specific access policy with the decision to the accessed device without regard as to whether the access request is granted or denied.

11. Access decision evaluation system according to claim 10, wherein the access policy deriver is further arranged to derive the derived device specific access policy with context attributes as variables to enable the accessed device to evaluate subsequent access requests from the accessing device under different contexts, and wherein the policy decision point of the accessed device is arranged to decide if the subsequent access requests are granted or denied by requesting context information from a context source comprised in the access decision evaluation system.

12. Central decision evaluation apparatus in an access decision evaluation system comprising an accessing device, an accessed device and the central decision evaluation apparatus, the central decision evaluation apparatus comprising:
a database of one or more central access control policies,
an access policy decision point arranged to evaluate an evaluation request from the accessed device using at least one of the one or more central access control policies stored in the database in order to reach a decision on if an access request being sent from the accessing device to the accessed device is granted or denied, and
an access policy deriver arranged to derive from the at least one of the one or more central access control policies that was used for the evaluation a device specific access policy,
wherein the central decision evaluation apparatus is arranged to send the decision and the device specific access policy to the accessed device to enable the accessed device to decide if a subsequent access request is granted or denied based on the device specific access policy, wherein the central decision evaluation apparatus sends the device specific access policy with the decision to the accessed device without regard as to whether the access request is granted or denied.

13. Central decision evaluation apparatus according to claim 12, wherein the access policy deriver is further arranged to derive the device specific access policy with context attributes as variables to enable the accessed device to evaluate subsequent access requests from the accessing device under different contexts.

14. Accessed device in an access decision evaluation system comprising an accessing device, the accessed device and a central decision evaluation apparatus, the accessed device comprising:
 a local memory storing one or more device specific access policies,
 a matching point, and
 a policy decision point,
 wherein the matching point is arranged to evaluate an access request from the accessing device to see if the access request matches with one of the one or more device specific access policies stored in the local memory, if so, the policy decision point is arranged to decide if the access request is granted or denied based on the matched device specific access policy, if not so, the accessed device is arranged to send an evaluation request asking if the access request is granted or denied to the central decision evaluation apparatus, and the accessed device is arranged to, in response to sending the evaluation request, receive and store a device specific access policy related to the access request with a decision on the access request regardless of whether the access request is granted or denied.

15. Accessed device according to claim 14, wherein the local memory is a size-constrained local memory only being able to store a fixed amount of device specific access policies.

* * * * *